Dec. 6, 1966 O. B. SHERMAN 3,289,247
APPARATUS FOR FORMING HOLLOW PLASTIC ARTICLES
Original Filed Sept. 21, 1953
3 Sheets-Sheet 1
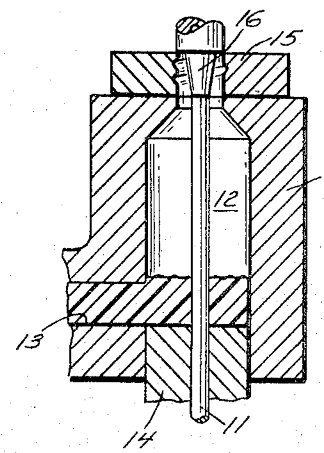
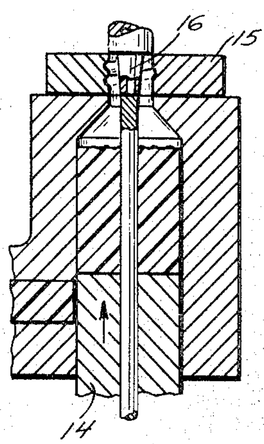
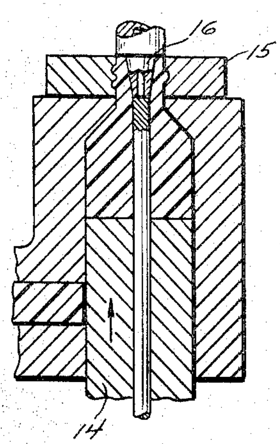
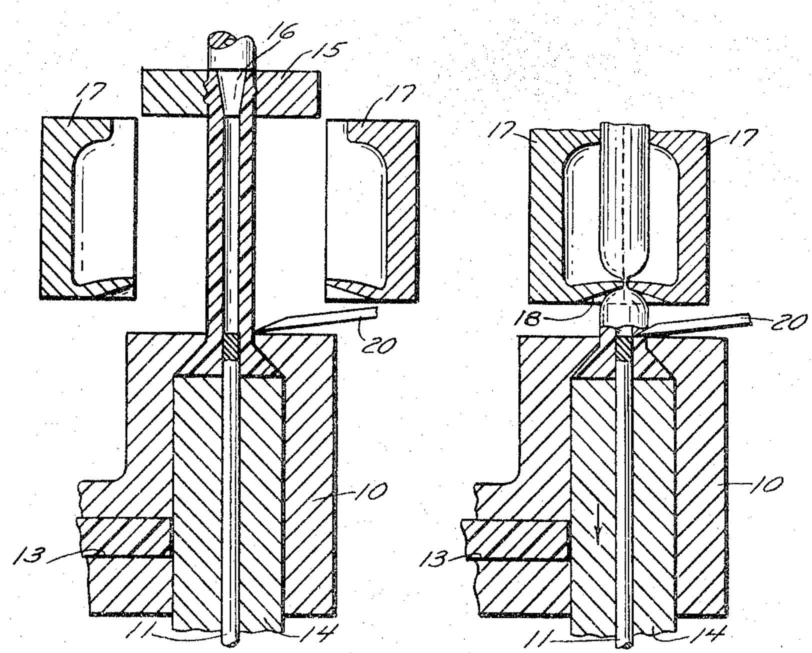
INVENTOR.
ORVILLE B. SHERMAN
BY
Spencer L. Blaylock, Jr.
& W. A. Schaich
ATTYS.

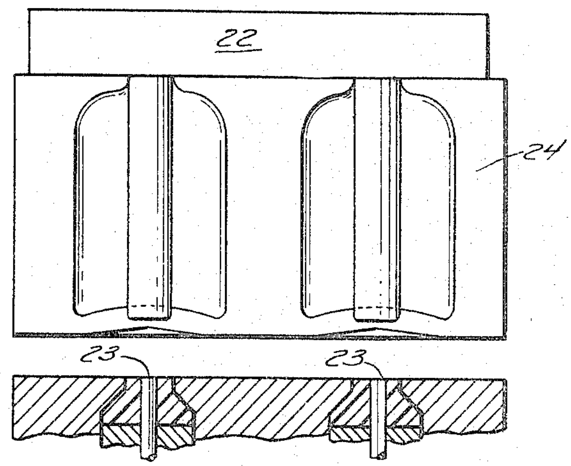
FIG. 6
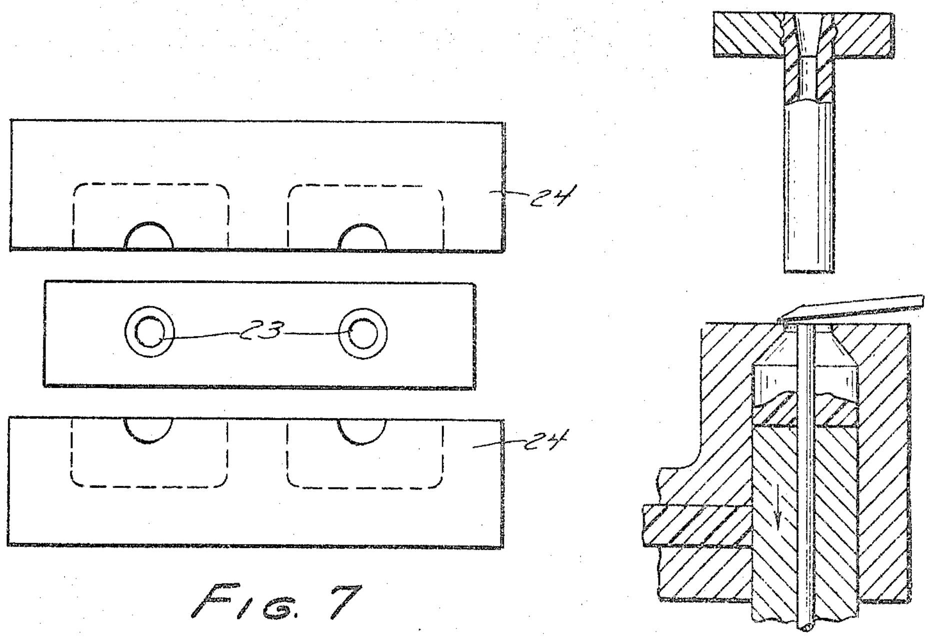
FIG. 7
FIG. 8
INVENTOR.
ORVILLE B. SHERMAN
BY
Spencer L. Blaylock, Jr.
& W. A. Schaich ATTYS.

APPARATUS FOR FORMING HOLLOW PLASTIC ARTICLES
Original Filed Sept. 21, 1953
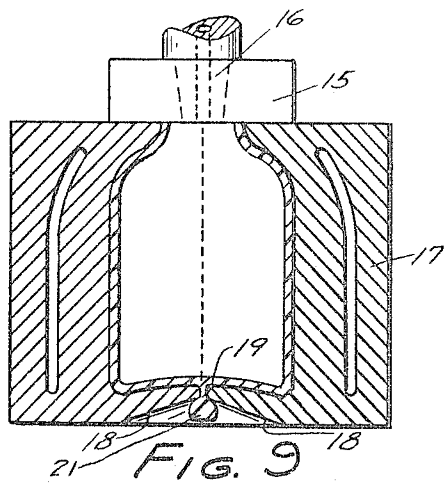
FIG. 9
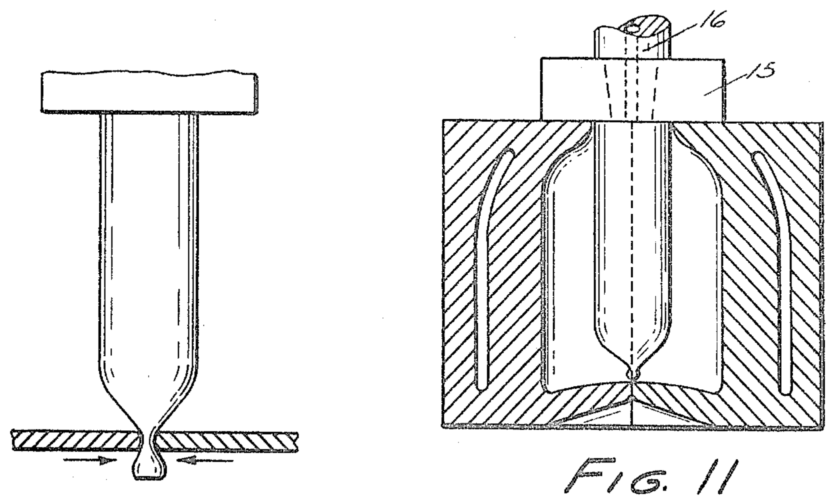
FIG. 10
FIG. 11
INVENTOR.
ORVILLE B. SHERMAN
BY
Spencer L. Blaylock, Jr.
W. A. Schaich
ATTYS.

3,289,247
APPARATUS FOR FORMING HOLLOW PLASTIC ARTICLES

Orville B. Sherman Ho-Ho-Kus, N.J., assignor to Owens-Illinois Inc., a corporation of Ohio Application Oct. 6, 1959, Ser. No. 844,690, now Patent No. 3,114,594, which is a continuation of application Ser. No. 381,257, Sept. 21, 1953. Divided and this application Aug. 23, 1963, Ser. No. 304,134
1 Claim. (Cl. 18—5)

This invention relates to the manufacture of hollow articles and more particularly to the manufacture of hollow articles having a neck opening and made of organic plastic material.

This application is a division of my copending application, Serial Number 844,690, filed October 6, 1959 and now Patent No. 3,114,594 which is a continuation of my application Serial Number 381,257, filed September 21, 1953, now abandoned and assigned to the assignee of the present invention.

It is an object of this invention to provide a method of forming hollow plastic articles wherein a minimum of trimming or other operations is required after forming.

Other objects of the invention will appear hereinafter.

Basically the method comprises extruding a quantity of plastic material from a parent mass into a tubular cavity, one end of the cavity being open, separating the quantity of plastic in the cavity from the parent mass, applying force to the mass of plastic in the cavity to force a portion of the plastic out of the open end of the cavity into a neck mold positioned over the cavity, continuing the application of force to said tubular mass simultaneously with the axial movement of the neck mold away from the open end of the cavity thereby removing a portion of the mass of plastic in the cavity, with the neck formed integral therewith, from the cavity, severing said removed portion from the remainder of the plastic in the cavity, and expanding the plastic to the walls of the mold by applying fluid under pressure.

Referring to the accompanying drawings:

FIGURES 1 to 5 are sectional elevational views of an apparatus for performing the steps of the method;

FIGURE 6 is a part sectional elevational view of an apparatus for performing a modification of the method;

FIGURE 7 is a plan view of the same;

FIGURE 8 is a sectional elevational view of a part of the apparatus showing the steps in a further modification of the method;

FIGURE 9 is a sectional elevation of one form of mold; and

FIGURES 10 and 11 are sectional elevational views showing a further modification of the method.

Referring to FIGURES 1 to 6, the apparatus for performing the method includes a body 10 having a vertical opening therethrough and a mandrel 11 positioned in the opening to form a tubular cavity 12, the upper end of the cavity being inwardly tapered toward the mandrel. The tubular cavity 12 is in communication with the outlet of a plasticizer and extruder (not shown) through communicating channel 13. A sleeve 14 surrounds the mandrel 11 and reciprocates vertically in the cavity 12 from a position below the communicating channel 13 to a position below the open end of the tubular cavity 12.

A partible neck mold 15 and hollow core 16 are mounted for relative axial movement into and out of alinement with the tubular cavity 12. A partible mold 17 is provided in which a tubular mass of plastic is expanded, as presently described. The bottoms of the mold sections are beveled at 18 (FIGURE 9) and slightly spaced apart at 19, when the mold is closed, in order to seal the plastic tubing.

At the beginning of the preferred method, the sleeve

14 is in its lowermost position and plastic material supplied by the extruder is allowed to enter through communicating channel 13 to a definite predetermined height in the tubular cavity. The sleeve 14 is then moved upwardly severing a quantity of plastic in the tubular cavity from the parent mass in the communicating channel. Continued movement of the sleeve forces a quantity of plastic material in the tubular cavity upwardly into the neck mold 15, which is in contact with the body 10, the core 16 being in contact with the mandrel 11. The neck mold and sleeve are then relatively moved upwardly thereby removing a portion of the tubular shaped mass of plastic, with the integral neck, from the cavity.

The sections of the mold 17 are then closed about the length of tubing, with the integral neck portion, pinching the length of tubing between the bottom of the mold sections, as shown in FIGURE 5. The shear blade 20 is then moved across the top end of the cavity severing the tubing from the remainder of the plastic in the cavity. Fluid is applied through the hollow core 16 to expand the tubing to the walls of the mold, as shown in FIGURE 9. After removal from the mold, the only trimming that is required is the removal of the small nubbin 21 of plastic which was pinched between the ends of the mold.

In describing this preferred form of the method, the apparatus has been shown as extruding the plastic material upwardly, but such is not required and the plastic material may be extruded in any direction, and the neck mold moved axially thereto, since the material is always under positive control. For example, the extruder might be positioned to extrude at any inclined angle, horizontaly or even downwardly.

A modification of the method may be performed, as shown in FIGURE 8, by severing the length of tubing with the integral neck from the plastic material in the tubular cavity before closing the mold sections about the tubing.

A further modification may be performed by severing the length of tubing and pinching the end of the tubing to seal it before closing the sections of the mold. For example, the tubing may be pinched as shown in FIGURE 10 or otherwise marvered to seal the end. The sections of the mold are then closed about the tubing and the tubing is expanded to the walls of the mold by applying fluid under pressure through the core 16 (FIGURE 11). In this latter modification, the article is completed and no trimming is required after removal from the mold. Obviously, the bottom sections of the mold need not be spaced apart as in the other modification of the method.

A further modification of the method may be performed as shown in FIGURES 6 and 7 where a multiplicity of neck portions are simultaneously formed into a series of neck molds 22 by extruder orifices 23 and a length of tubing simultaneously extruded integral with each neck portion. The lengths of tubing may be severed before or after closing mold sections of a multiple cavity mold 24, as in the previous modifications of the method, and the lengths of tubing finally simultaneously expanded to final shape by applying fluid under pressure through the neck portion of each respective length of tubing.

The invention has been described as being applied to thermoplastic materials. The term "thermoplastic" as used herein defines any organic material which has the required condition of plasticity to permit expansion and setting in predetermined form.

The terms tubular and tubing, as used herein, are intended to include any hollow shapes in which plastic materials may be formed including non-circular and irregular shapes.

Modifications may be resorted to within the spirit and scope of the appended claim.

I claim:

A machine for forming hollow articles of plastic material comprising, in combination, extrusion means including an extrusion die having a substantially vertical axis for extruding a plastic tube in upward direction; a pair of complementary mold halves movable in direction transverse to said axis between an open and a closed position; a blow nozzle having an outer diameter equal to the inner diameter of a neck of the article to be formed, said blow nozzle being arranged concentric with said axis and being movable between a lowered position abutting against said extrusion die and a raised position; a pair of complementary ring halves surrounding said blow nozzle and having inner surfaces corresponding to the outer surface of said neck, said ring halves being movable between an open and a closed position.

References Cited by the Examiner

UNITED STATES PATENTS 3,084,383 4/1963 Figna ---------------- 18—5

FOREIGN PATENTS 635,140 2/1962 Italy.

J. SPENCER OVERHOLSER, *Primary Examiner.*

MICHAEL V. BRINIDISI, WILLIAM J. STEPHENSON, *Examiners.*

W. L. McBAY, *Assistant Examiner.*